BACILLUS sp. No. 38—2

United States Patent Office 3,826,715
Patented July 30, 1974

3,826,715
NOVEL AMYLASE AND PROCESS FOR
PREPARING THE SAME
Koki Horikoshi, Fujimi, and Yonosuke Ikeda and Yoshitake Tanaka, Tokyo, Japan, assignors to Rikagaku Kenkyusho, Saitama-ken, Japan
Filed Apr. 14, 1972, Ser. No. 244,046
Claims priority, application Japan, Apr. 19, 1971, 46/25,079
Int. Cl. C07g 7/02
U.S. Cl. 195—66 R           5 Claims

ABSTRACT OF THE DISCLOSURE

A novel amylase characterized by being a liquefying amylase having broad optimal pH values of 4.5, 7 and 9, and a method for preparing thereof characterized by fermentation of a strain of microorganism, *Bacillus* sp. No. 38-2 (ATCC 21783) in an alkaline culture medium containing a carbonate.

---

Figure 1:
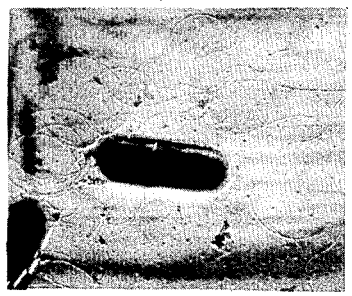

This invention relates to a novel enzyme, to a process of manufacture of the same, by inoculation of a suitable nutrient medium and the novel microorganism from which the enzyme is prepared.

More specifically, the enzyme of the present invention is a novel amylase. The enzyme is prepared from a strain of the *Bacillus* genus which is designated herein as *Bacillus* sp. No. 38-2 or its mutants. This organism has been isolated from a specimen of soil collected in Hirosawa district of Wako-shi, Saitama Prefecture, Japan.

There are known various methods for the manufacture of amylase, a starch-decomposing enzyme, having optimal pH in the acid or neutral side (Ref.: "Advances in Applied Microbiology," 7, 293 (1965)) but a process for the production of amylase using a novel microorganism and special medium, and culture conditions as in the present invention has not been described in the any literature.

The present invention resides in the discovery of the novel microorganism, its culture conditions, the production of the novel enzyme amylase, its chemical composition and its properties. The invention also comprises the method of isolation and purification of the enzyme and the use of the enzyme.

The microorganism used in the present invention shows good growth under culture conditions to be described below in detail and produces the amylase of the present invention. It is a new strain belonging to the *Bacillus* genus, *Bacillus* sp. No. 38-2. The said *Bacillus* sp. No. 38-2 has been discovered by the present inventors.

The said strain, *Bacillus* sp. No. 38-2 which is employed in the process of the present invention, is isolated from the soil collected in Hirsoawa district of Wako-shi, Saitama Prefecture, Japan.

The isolation of the said microorganism, *Bacillus* sp. No. 38-2 was carried out by a procedure described in below:

The soil specimen is suspended in sterile distilled water, the suspension is diluted to different concentrations and samples of each dilution are spread on the surface of Petri dishes which contain a suitable nutrient treated with agar. After incubation for 1-2 days, at 37°-45° C., preferably at 37°-40° C., under aerobic conditions, at a pH between 7.5-11, the colony of the microorganism which it is desired to isolate is transferred to a slanted agar plate for the purpose of obtaining an increased yield of the culture.

A suitable medium for the production from the soil is:

(a)

| | | |
|---|---|---|
| Peptone | g | 5 |
| Yeast extract | g | 5 |
| $K_2HPO_4$ | g | 1 |
| $MgSO_4 \cdot 7H_2O$ | g | 0.2 |
| Soluble starch | g | 20 |
| Agar | g | 15 |
| Water | ml | 300 |

(b)

| | | |
|---|---|---|
| 10% $Na_2CO_3$ solution | ml | 100 |

After sterilization at 115° C. for 15 minutes, solution (a) and solution (b) were mixed. The plate was then incubated at a temperature of 37° C. for 24 hours.

Thus, a colony of a microorganism which produced the said amylase was isolated from colonies on the plate.

This organism has been deposited at the Fermentation Research Institute, an agency of the Board of Industrial Science and Technology where it is identified as *Ferm. P. No. 614*.

The strain identified as the said *Bacillus* sp. No. 38-2 has been deposited (Without restriction) with the American Type Culture Collection (ATCC) at 12301 Parklawn Drive, Rockville, Md. 20852 U.S.A. as ATCC access number 21783, and is on deposit with ATCC as unrestricted deposit, permitting the public to have full access to the culture, as of Mar. 23, 1972.

All restrictions on the availability of the culture deposit to the public will be irrevocably removed on the granting of a patent from this application.

Further, the above culture will be maintained by the depositor throughout the effective life of the patent. The present inventors found the fact that the said microorganism, *Bacillus* sp. No. 38-2 produced and accumulated a novel amylase under the culture conditions to be described in later, and succeeded in establishing the process for the manufacture of the amylase of the present invention.

The said *Bacillus* sp. No. 38-2 has the following properties: The microbiological properties were tested by the methods described in "Aerobic Sporeforming Bacteria" by Nathan R. Smith, R. E. Gordon and F. E. Clark (United States Department of Agriculture, November 1952) and "Bergey's Manual of Determinative Bacteriology" (1957).

We will explain properties and characteristics of this microorganism referring attached drawings.

Figure 2:
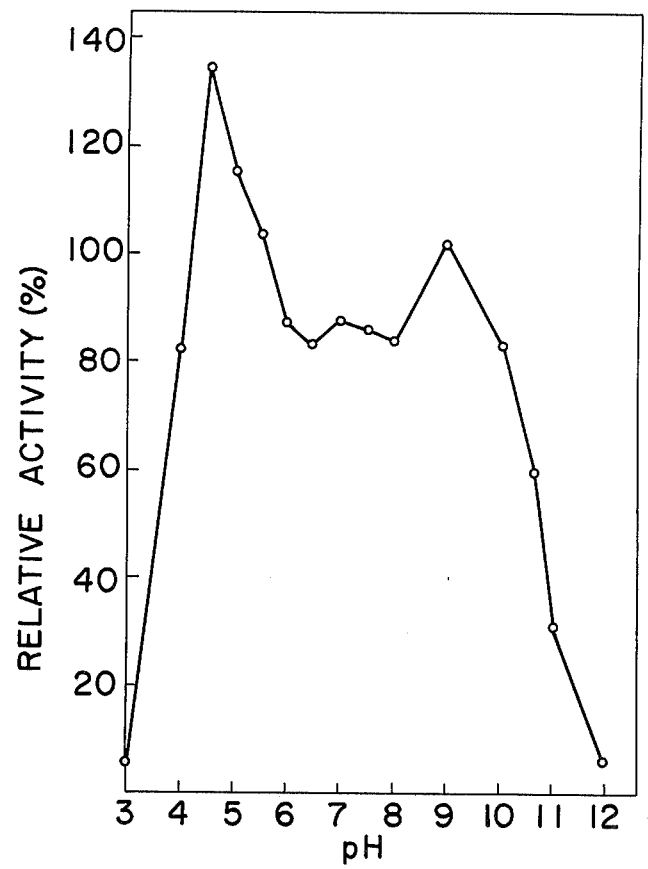

FIG. 1 is an electron photomicrograph of the microorganism used in the present invention, *Bacillus* sp. No. 38-2; and FIG. 2 is a graph showing the optimal pH of the amylase of this invention.

In addition, the composition of medium used in the above test is as follows:

| Medium | Sodium carbonate | Peptone | Beef extract | Yeast extract | Glucose | Starch | Others |
|---|---|---|---|---|---|---|---|
| Bouillon | ¹10 | 5 | 3 | | | | |
| Bouillon-agar | ¹10 | 5 | 3 | | | | Agar 15. |
| Sodium chlorid-bouillon | ¹10 | 5 | 3 | | | | NaCl 70. |
| Glucose-bouillon | ¹10 | 5 | 3 | | 10 | | |
| Glucose-bouillon agar | ¹10 | 5 | 3 | | 10 | | Agar 15. |
| Gelatin medium | ¹10 | 5 | 3 | | | | Gelatin 5. |
| Peptone water | ¹10 | 5 | | | | | |
| Potato medium | ¹10 | | | | | | Potato extract (Difco) 50, agar 15. |

See footnotes at end of table.

TABLE—Continued

| Medium | Sodium carbonate | Peptone | Beef extract | Yeast extract | Glucose | Starch | Others |
|---|---|---|---|---|---|---|---|
| Growth condition | 10 | 5 | | 5 | | 20 | $K_2HPO_4$ 1, agar 15, $MgSO_4 \cdot 7H_2O$ 0.2. |
| V. P. test | 10 | 7 | | | 5 | | NaCl 5. |
| Reduction of nitrate | 10 | 5 | 3 | | | | $KNO_3$ 1. |
| Hydrolysis of starch | 10 | 5 | | 5 | | 20 | $K_2HPO_4$ 1, agar 15, $MgSO_4 \cdot 7H_2O$ 0.2. |
| Utilization of citrate | ¹ 10 | | | | | | Sodium chloride 1, $MgSO_4 \cdot 7H_2O$ 0.2, $(NH_4)_2HPO_4$ 1, $KH_2PO_4$ 0.5, citrate 2, agar 15. |
| Utilization of ammonium salt | 10 | | | | 5 | | $(NH_4)_2HPO_4$ 1, KCl 0.2, $MgSO_4$ 0.2, yeast extract 0.2, saccharide 5. |
| Glucose-nitrate | ¹ 10 | | | | 10 | | $KH_2PO_4$ 1, $NaNO_3$, 1, agar 15. |
| Growth under anaerobic condition | 10 | 10 | 3 | 2 | 10 | | $K_2HPO_4$ 5. |
| Glucose-asparagine | ¹ 10 | | | | 10 | | Asparagine 0.5, $K_2HPO_4$ 0.5, agar 15. |
| Producibility of indole | 10 | | | | | | Difco trypton 10, BBL tryptocase 10. |
| Utilization of saccharide | 10 | | | | | | $(NH_4)_2HPO_4$ 1, KCl 0.2, $MgSO_4$ 0.2, yeast extract 0.2, saccharide 5. |
| Hydrolysis of casein | 10 | | | 5 | 10 | | Casein 5, $K_2HPO_4$ 1, agar 15, $MgSO_4 \cdot 7H_2O$ 0.2. |
| Catalase reaction | 10 | 5 | | 5 | | 20 | $K_2HPO_4$ 1, agar 15, $MgSO_4 \cdot 7H_2O$ 0.2. |

¹ Or not added.

NOTE.—Figure in the above table stands for weight (g) per 1 liter of water.

BACILLUS SP. NO 38-2

(a) Characteristics and Biochemical Properties

For the purpose of further characterization, the characteristics of the culture and the biochemical properties of *Bacillus* sp. No. 38-2 have been examined with agar nutrients and other nutrient broths which are conventionally utilized for examining the form of *Bacillus* strains. The data are reported in Table 1 hereinbelow:

TABLE 1

| pH in the medium | Growth in medium | |
|---|---|---|
| | pH 7 | pH 10.2* |
| Medium: | | |
| (1) Bouillon | Growth scant | Poor growth. |
| (2) Bouillon-agar | do | Do. |
| (3) Glucose-bouillon | Poor growth | Turbidity, good growth. |
| (4) Glucose-bouillon agar | do | Good growth. |
| (5) Gelatin medium | | Growth, liquefied. |
| (6) Peptone water | | Growth. |
| (7) Potato medium | Growth scant | Good growth. |

*1% of $Na_2CO_3$ was added.

By reference to Table 1, the media employed are listed in column 1, the degree of growth at pH 7 and 10.2, respectively, is tabulated in columns 2 and 3.

*(Microscopic Morphology)*

Size of the said microorganism is $0.5-0.6\mu \times 2.0-3.0\mu$; the sporangium is definitely swollen and the spore which is formed in the end of the cell is oval, and the size of the spore is $0.9-1.0\mu \times 1.2-1.5\mu$.

The microorganism has *pertrichous flagella*, as will be seen in the electron micrograph attached as FIG. 1. The gram stainability and the antiacidity of the said *Bacillus* sp. are positive and negative, respectively. The said *Bacillus* sp. grows very well on the medium (soluble starch, yeast extract, peptone, $K_2HPO_4$, $MgSO_4 \cdot 7H_2O$ and 1% $Na_2CO_3$, adjusted at pH 10.2) to be described below, as motile colonies. The characteristic of this *Bacillus* sp. is that it grows well on alkaline medium, that is, 7.5–11, preferably about 10 rather than neutral medium.

(b) Physiological Properties (1) Optimal Growth Conditions:
   pH: around 10
   Temperature: 37–40° C. Aerobic
(2) Conditions under which the microorganism can grow:
   pH: 7.5–11
   Temperature: up to 45° C. Aerobic The following experiments were carried out using the medium containing 1% $Na_2CO_3$.

(3) Gram stain ability: Positive
(4) Voges-Proskauer reaction: Positive
(5) Nitrate is reduced.
(6) Catalase: Positive
(7) Hydrolysis of gelatine and casein: Positive
(8) Hydrolysis of starch: Positive
(9) Utilization of citrate: Utilized but poor
(10) Utilization of ammonium salts: Utilized
(11) Growth in 7% sodium chloride solution: Poor growth
(12) Growth on glucose-nitrate medium: Growth
(13) Growth under anaerobic condition: Growth
(14) Growth on glucose-asparagine medium: Growth
(15) No production of indole.

(c) Utilization of Carbon Source

Utilizes glucose, fructose, xylose, sucrose, maltose, milk sugar and arabinose, in a medium containing 1% carbonate, but poorly utilizes galactose, trehalose, and inulin. Acid is produced. Yeast extract, peptone, corn steep liquor and the like are used as the nitrogen source.

Then, comparative examination of the said *Bacillus* sp. No. 38-2 according to the method of classification described in the said "Aerobic Spore-forming Bacteria" and "Bergey's Manual of Determinative Bacteriology" (1957) (from p. 613, et. seq.) showed that the said microorganism had some points similar to the known microorganisms belonging to the *Bacillus* sp., but were entirely different in characteristic properties, and there were no species among the known genus which agreed with the afore-mentioned properties. It was, therefore, concluded that it would be appropriate to establish new strains of the *Bacillus* sp. Since the said microorganism is an aerobic, spore-forming bacteria, it is clear that it should belong to the *Bacillus* genus. The highly characteristic point of the said microorganism is that the growth is especially good in alkaline medium, the optimal pH being around 10.

Some examinations were made on known bacterial species in relation to *Bacillus* sp. No. 38-2, and *Bacillus firmus* may be cited as a comparative organism. *Bacillus firmus* is negative to the Vogel-Proskauer reaction, and has an optimal pH of 6.2 in a medium containing glucose. In contrast, *Bacillus* sp. No. 38-2 is positive to the Vogel-Proskauer reaction, and shows growth in a medium containing glucose at pH 7.5–11, the optimal being around pH 10.

Furthermore, *Bacillus* sp. No. 38-2 shows no growth inhibition against glucose, however, *Bacillus firmus* shows glucose inhibition.

In these respects, the said *Bacillus* sp. No. 38-2 is clearly differentiated from *Bacillus firmus*.

Next, *Bacillus subtilis* may also be cited as a comparative microorganism for *Bacillus* sp. No. 38-2. However, in the characteristic of *Bacillus subtilis* there is little difference between the major axis of the mycelium and the minor axis of the spore (the major axis of the mycelium: $0.7-0.8\mu$, the minor axis of the spore: $0.6-0.9\mu$).

In contrast, the major axis of the mycelium of Bacillus sp. No. 38-2 is 0.5-0.6μ and the axis of its spore is 0.9-1.0μ.

Furthermore, in physiological properties Bacillus subtilis has optimal pH of around 5.5 in the medium, however, Bacillus sp. No. 38-2 shows good growth in the medium adjusted at pH 7.5-11 (the optimal pH being around 10). In these respects, Bacillus sp. No. 38-2 is clearly distinguished from Bacillus subtilis.

Summing up, it is noted that the said Bacillus sp. No. 38-2 is a microorganism belonging to Bacillus genus because of the aerobic spore-forming bacteria, and based on its microbiological properties, especially the fact that the optimal pH for the growth is around 10, it is appropriate to establish a new species for the said microorganism, Bacillus sp. No. 38-2.

According to the process of the present invention, the alkaline amylase of the present invention can be produced using not only Bacillus sp. No. 38-2, described above, but also natural and artificial mutant thereof producing the said alkaline amylase.

In the practice of the present invention, the fermentation may be carried out according to the following method.

The method is characterized by the addition of carbonate to the composition of the culture medium. In this medium, starch, soluble starch, and the like are used as the carbon source. Yeast extract, peptone, corn-steep liquor, and the like are used as the nitrogen source. Various carbonates, such as potassium carbonate, sodium carbonate, and sodium bicarbonate are used as the inorganic salts and added to the solution to prepare the culture medium which is adjusted to about pH 10.5.

The medium thus prepared is inoculated with the strain of a microorganism, Bacillus sp. No. 38-2, and cultured with shaking at a temperature of about 30-37° C. In general, the activity of the enzyme produced reaches a maximum after about 24-64 hours of culture.

Since the period required to reach the maximum enzyme activity may vary according to the aeration and stirring conditions, even when the same temperature and culture medium of the same components are used, it is advisable to decide the period of culture by measuring the enzyme activity in each case.

The second important condition is the pH value of the medium. It is necessary to adjust the initial pH value within the range of 7 to 11 with carbonate or bicarbonate salts. Further, the optimal pH value when using a culture medium containing sugars is 8 to 11.

The commonly used physicochemical methods can be employed for the isolation of the enzyme from the culture broth. For example, after cooling the culture broth, acetic acid is added or not added to the culture broth to neutralize it, and ethanol is then added to precipitate the enzyme, alkaline amylase, quantitatively. The precipitate is then collected, thoroughly washed with ethanol, and dried. The enzyme, amylase, thus obtained from the culture of the said microorganism is confirmed to be an amylase having the optimal pH values of 4.5, 7 and 9 and retaining the activity.

As the culture conditions, it is necessary to have an alkaline medium containing a high concentration of carbonate. Various carbonates are added to the medium containing a composition such as the carbon source and nitrogen source necessary for the growth of the microorganism. For example, it is necessary to make a medium containing glucose, $K_2HPO_4$, yeast extract, peptone, and $MgSO_4 \cdot 7H_2O$, with the addition of sodium carbonate, potassium carbonate, or sodium bicarbonate. It is desirable to make the concentration of the carbonate added to 0.5-5%.

For the advantageous production of the objective amylase, addition of a carbonate to the above medium is an extremely important condition and the following fact is proved from experimental results.

The growth of the microorganism used, Bacillus sp. No. 38-2 and production of amylase were examined by the use of the foregoing medium added with 1% of sodium carbonate or 1% of each of various carbonates, and the same medium from which the carbonate was eliminated and added in its place with 1% of sodium chloride or potassium chloride, and adjusted to pH 10.0 with sodium hydroxide. Growth of the microorganism (said Bacillus sp. No. 38-2) was tested by taking the culture broth after 18 hours into a cuvette of 1 cm. light path and measuring its absorbance at 660 mμ, and amylase activity was measured under the condition described in later. These results are listed in Table 2, which indicates that the presence of a carbonate in the medium is an important condition for the production of the amylase of the present invention.

TABLE 2

| | Salt added | Initial pH | Growth | Amylase activity (u./ml.) | |
|---|---|---|---|---|---|
| | | | | pH 4 | pH 9 |
| 1 | None [1] | 10.0 | 0.7 | 150 | 100 |
| 2 | NaCl 1% | [2] 10.0 | 0.5 | 160 | 100 |
| 3 | KCl 1% | [2] 10.0 | 0.5 | 160 | 100 |
| 4 | Phosphate buffer | 8.0 | 0.9 | 350 | 210 |
| 5 | $NaHCO_3$ 1% | 8.8 | 1.2 | 2,500 | 1,200 |
| 6 | $Na_2CO_3$ 1.0% | 10.2 | 1.3 | 3,100 | 2,000 |
| 7 | $K_2CO_3$ 1.0% | 10.2 | 1.2 | 2,600 | 1,400 |
| 8 | $Na_3PO_4$, $K_2HPO_4$ | 11.2 | 0.67 | 450 | 300 |

[1] Only containing soluble starch, $K_2HOP_4$, yeast extract, peptone and $MgSO_4 \cdot 7H_2O$.
[2] Adjusted with NaOH.

The next important point in the culture condition is the pH during the culture. From the results of the following experiments, it is necessary to adjust the pH for the production of the amylase to the value selected in the range of 7 to 11. Examination of the effect of pH on the production of the amylase by varying the pH of the above culture medium containing 1% of sodium carbonate with HCl or NaOH, as shown in Table 3, indicated that the best result was obtained at pH 7-11, especially at pH 8-11, in the presence of glucose. In addition, Table 3 shows a variation of the amylase activity, when the activity at pH 9 is expressed as 100.

TABLE 3

| | Amylase activity (u./ml.) | | | | |
|---|---|---|---|---|---|
| pH | 7 | 8 | 9 | 10 | 11 |
| Medium: | | | | | |
| Containing 1% $Na_2CO_3$ | 200 | 1,100 | 2,800 | 3,000 | 800 |
| Not containing 1% $Na_2CO_3$ | <100 | <100 | <100 | <100 | <100 |

Effect of pH on the production of the amylase was then examined by varying pH of the culture medium with $NaHCO_3$ or $Na_2CO_3$ and the result is shown in Table 4.

TABLE 4

| Salt added | Initial pH | Final pH | Growth | Amylase activity (u./ml.) |
|---|---|---|---|---|
| None [1] | 7.0 | 7.0 | 0.1 | [2] |
| $NaHCO_3$ 0.5% | 8.9 | 9.4 | 0.8 | 750 |
| $NaHCO_3$ 1.0% | 9.0 | 9.5 | 0.9 | 1,500 |
| $NaHCO_3$ 2.0% | 9.2 | 9.6 | 1.0 | 1,800 |
| $Na_2CO_3$ 0.5% | 9.7 | 9.6 | 0.9 | 1,400 |
| $Na_2CO_3$ 1.0% | 10.3 | 9.8 | 9.8 | 1,500 |

[1] Only soluble starch (2%) $K_2HPO_4$ (0.1%), yeast (0.5%) extract, peptone (0.5%) $MgSO_4 \cdot 7H_2O$ (0.02%).
[2] Not produced.

Thus, under the foregoing culture conditions, the said microorganism, Bacillus sp. No. 38-2, preincubated in the same medium, is inoculated in the medium, and this is shake-cultured under appropriate condition, such as 24-64 hours at 30-37° C. After completion of the culture, cells are removed, the broth is neutralized with acetic acid or a similar acid, or not neutralized, and then an organic solvent such as ethanol or acetone is added to precipitate the amylase produced. The precipitate is then dehydrated and dried to obtain the objective substance.

The activity of the amylase so obtained is ca. 2,000–3,000 u./ml., the said amylase has an optimal pH in the alkaline side of around 9.

Physicochemical properties of the enzyme of this invention, the amylase, are as follows:

(1) Molecular weight: Molecular weight determined using Sephadex (the word "Sephadex" is a registered trade mark) is about 40,000.

(2) Optimal pH and range of stable pH: The pH values were adjusted to 4–5, 5–8.5, 9–11 and 11–12 with acetate, Tris-maleate buffer, glycine-sodium hydroxide and carbonate, respectively. In addition, the enzyme used is desalted using Sephadex G–25. FIG. 2 is a graph showing the optimal pH values of the amylase when the activity at pH 9 is expressed as 100%. As will be clear from FIG. 2, the optimal pH lies in each of 4.5, 7 and 9.

0.01 ml. of the enzyme of the present invention, added with 0.1 ml. of buffer solution of various pH's and 1.0 $\mu$ mole of $CaCl_2$ as a stabilizer, were heated at 60° C. for 30 minutes, and then to the said mixture 0.2 ml. of buffer at pH 9.0 were added to determine the residual activity. Its result is shown in Table 5.

TABLE 5

| pH | | Residual activity (percent) |
|---|---|---|
| 4 | Acetate buffer | 0 |
| 5 | | 12 |
| 6 | Tris-maleate buffer | 100 |
| 7 | | |
| 8 | | |
| 10 | $Na_2CO_3 \cdot NaHCO_3$ | 70 |
| 11 | $Na_2CO_3$ | 10 |

(3) Assay of Enzyme Activity: 0.01 ml. of the said amylase which was suitably diluted so as to reduce 10–20% of absorbance of 700 m$\mu$, were added to 0.2 ml. of 0.2% potato starch solution and 0.2 ml. of 0.2 M glycine-NaCl-NaOH buffer at pH 9.0 (or 0.2 ml. of 0.1 M acetate buffer at pH 4.0), and incubated at 40° C. for 10 minutes. After reaction, 0.5 ml. of 0.5 M acetic acid were added to the said mixture. Then, 3 ml. of 0.005% iodine solution were added. An absorbance of the sample was measured at 700 m$\mu$. The readings were corrected by subtracting the value of the blank in which the enzyme solution was mixed with 0.5 M acetic acid before the starch solution was added.

Definition of Enzyme Activity: One unit of the enzyme was defined as that amount of enzyme which reduced 10% of absorbance at 700 m$\mu$ under the standard condition described above.

(4) Range of Working Temperature: The enzyme activity was measured by the usual method at pH 8 varying the temperature. The measurement was carried out using solution containing no $Ca^{++}$ as a stabilizer.

As the result, the residual activity was obtained as shown in Table 6.

TABLE 6

| Temp. (° C.) | Time (min.) | Residual activity (percent) |
|---|---|---|
| 50 | 15 | 100 |
| 50 | 30 | 100 |
| 55 | 15 | 80 |
| 60 | 15 | 10 |

(5) Activation and Stabilization: Activation of the enzyme was examined by adding $Ca^{++}$. As the result, this activation was not observed, but increase of thermal stability was detected by adding $Ca^{++}$ at pH 8, as shown in Table 7. All the samples were incubated at indicated temperature for 30 minutes.

TABLE 7

| | Residual activity (percent) | |
|---|---|---|
| Temp. (° C.) | pH 4 | pH 9 |
| 50 | 100 | 100 |
| 55 | 100 | 100 |
| 60 | 100 | 100 |
| 65 | 100 | 100 |
| 70 | 61 | 65 |
| 75 | 10 | 10 |
| 80 | 0 | 0 |

(6) Method of Purification: To the culture broth obtained by the culture of the microorganism, Bacillus sp. No. 38–2, 5 M $CaCl_2$ was added to adjust the broth to pH 7, by which precipitates were formed. The resulting precipitates were removed by centrifugation.

To the filtrate ½ volume of acetate were added to form the precipitates.

The resulting precipitates were collected and dissolved with water.

After dialysis overnight, it was concentrated with polyethyleneglycol. After gel-filtration chromatography using Sephadex G–100, active fractions were collected. The fractions were adsorbed onto DEAE cellulose column equilibrated with 10 mM. Tris-HCl buffer at pH 8.5, in which 1 mM. $CaCl_2$ contained, and then the enzyme was eluted with $CaCl_2$ having the concentration of from 5 mM. to 50 mM., usually 40 mM.

Thus, the active fraction was collected and purified by gel-filtration chromatography using Sephadex G–75 to obtain the final product.

In addition, curves showing the relation between the pH value and the enzyme activity, which were measured before and after purification do not provide any difference.

(7) Homogeneity of the Enzyme: From the following result, it was observed that the enzyme of the present invention was homogenous.

(1) Sedimentation constant from ultracentrifugal analysis was about 4 S.

(2) A single peak of the activity was observed by gel filtration chromatography.

(3) Disc electrophoretic analysis at pH 8.3 confirmed that it was monodisperse.

(4) The ratio of the enzyme activity at the pH values between 4 and 9 does not change, even when the enzyme activity is partially lost by heating.

Furthermore, the comparison of the physicochemical properties of the enzyme and the known amylases, for example, saccharifying and liquefying amylases produced by the culture of a microorganism, Bacillus subtilis (Ref.: "Advances in Applied Microbiology" 7, p. 293 (1965)) is shown in Table 8.

The enzyme of the present invention is characterized in that it has the broad optimal pH values of 4.5, 7 and 9.

Thus, it is concluded that the enzyme of the present invention is a novel liquefying amylase.

TABLE 8

| Enzymes | Type | Thermal stability ° C. | pH's stability | Optimal pH | Stabilization by $Ca^{++}$ | Hydrolysis of starch (percent) |
|---|---|---|---|---|---|---|
| Amylases produced by the culture of Bacillus subtilis | Liquefying | 65–90 | 4.8–10.8 | 5.4–6.0 | + | 35 |
| | Saccharifying | 55–70 | 4.0–7.8 | 4.8–5.2 | − | 70 |
| Amylase of the present invention | Liquefying | [1] 60–70 | 5–10 | 4.5, 7.0, 9.0 | + | 15 |

[1] In the presence of $Ca^{++}$.
+ Stable; −: Not stable.

Summing up, comparison of the physicochemical properties of the enzyme of the present invention, amylase, with those of the known amylase indicates clearly that this is a novel amylase which is different from any of the known amylases.

Efficacy in Practical Use: The enzyme of this invention, amylase, is a starch-decomposing enzyme that has an optimal pH in the alkaline side (pH around 10) and shows enzymatic activity when used with a detergent.

The enzymatic activity of this amylase in the detergent will be explained below as the efficacy of the enzyme of this invention based on experimental results.

(1) Usage: When the enzyme of this invention is to be used as an additive for detergents, the enzyme powder of this invention is directly added to the detergent, such as sodium dodecylbenzenesulfonate (DBS). There is no limitation in this preparation, such as the pH of the detergent, or the mixing ratio of detergent components and additives. For example, the use of 0.01–1.0% by weight of the enzyme preparation of this invention gives good efficacy, i.e., a good amylolytic power will appear.

(2) Efficacy (Enzymatic Activity in Detergents): The enzyme of this invention was incubated for a definite length of time at 40° C. in the presence of a detergent, and residual activity of the said enzyme was measured.

Experimental Method: The concentration of the detergent at the time of contact with the enzyme of this invention was 0.1%. Sodium dodecylbenzenesulfonate (DBS) was used as the detergent. The pH was adjusted to 10.5 at the time of the reaction by the use of a glycine-NaCl-NaOH buffer.

Reaction Solution:

|  | Ml. |
|---|---|
| Detergent, 0.5% | 2 |
| Glycine-NaCl-NaOH buffer | 3 |
| Enzyme of this invention (2,000 μ/ml.) | 1 |
| Additive for water | 4 |

Results: Residual Activity of the Enzyme of this Invention (Reaction temperature: 40° C.)

| Name of microorganism | Residual activity (percent) | | |
|---|---|---|---|
|  | 0 min. | 30 min. | 60 min. |
| Bacillus sp. No. 38–2 | 100 | 110 | 98 |

The amylase of the present invention is a novel amylase which is produced by the culture of a novel strain of *Bacillus* sp. No. 38–2 (ATCC 21783), in a culture medium containing a carbonate, inorganic materials, a nitrogen source, and a carbon source, and isolating the alkaline amylase produced in the culture medium.

Based on the physicochemical properties of the said amylase, this alkaline amylase has been determined as a novel enzyme compared with the known amylases.

Practical examples in the use of this invention are given below:

EXAMPLE 1

Medium composition:

| | G. |
|---|---|
| Soluble starch | 20 |
| $K_2HPO_4$ | 1 |
| Yeast extract | 5 |
| Peptone | 10 |
| $MgSO_4 \cdot 7H_2O$ | 0.2 |

The above composition was dissolved in 900 ml. of water and sterilized at 115° C. for 15 minutes. A solution of 10% $Na_2CO_3$ dissolved in 100 ml. of water was sterilized at 115° C. for 15 minutes. These two solutions were mixed to prepare a culture medium, 250 ml. of which were placed in shouldered shaking flask (Sakaguchi flask) of 1 liter capacity. The said *Bacillus* sp. No. 38–2 (ATCC 21783), preincubated in the same medium overnight, was inoculated in this flask, and the medium was adjusted at around 10 and shake-cultured at 37° C. for 48 hours. The cells were removed from the culture by a centrifuge, and at pH 9 1 ml. of this culture filtrate contained 2,500 units of alkaline amylase.

This culture broth was thoroughly cooled and 3 volumes of acetone were added, by which the enzyme precipitated quantitatively. This precipitate was thoroughly washed with acetone and dried in air. About 11 g. of brownish powder were obtained from the one liter of the culture broth.

The sample obtained thereby has an optimal pH around 9.0, and it was found to be an amylase (Specific activity, 200,000 u./g.).

EXAMPLE 2

Medium composition:

| | | |
|---|---|---|
| Soluble starch | g | 20 |
| $K_2HPO_4$ | g | 1 |
| Corn-steep liquor | ml | 50 |
| $MgSO_4 \cdot 7H_2O$ | g | 0.1 |

The above composition was dissolved in 900 ml. of water, adjusted at 6–6.5 with NaOH and sterilized at 115° C. for 15 minutes. A solution of 10% $Na_2CO_3$ dissolved in 100 ml. of water was sterilized at 115° C. for 15 minutes. These two solutions were mixed to prepare a culture medium 100 ml. of which were placed in shouldered shaking flask (Sakaguchi flask) of 1 liter capacity. The said *Bacillus* sp. No. 38–2 (ATCC 21783), preincubated in the same medium overnight, was inoculated in this flask, and the medium was shake-cultured at 37° C. for 72 hours. The cells were removed from the culture by a centrifuge, and at pH 9 1 ml. of this culture filtrate contained 3,800 units of amylase.

This culture broth was thoroughly cooled and 3 volumes of acetone were added, by which the enzyme precipitated quantitatively. This precipitate was thoroughly washed with acetone and dried in air. About 12 g. of brownish powder were obtained from one liter of the culture broth.

The same obtained thereby has an optimal pH around 9.0, and it was found to be an amylase (Specific activity, 350,000 u./g.).

EXAMPLE 3

Medium composition:

(A)

| | G. |
|---|---|
| Soluble starch | 20 |
| $K_2HPO_4$ | 1 |
| Yeast extract | 5 |
| Peptone | 10 |

Salt solution of the following composition (B) dissolved in 100 ml. of water.

(B)

| | G. |
|---|---|
| $MgSO_4 \cdot 7H_2O$ | 4 |
| NaCl | 0.2 |
| $FeSO_4 \cdot 7H_2O$ | 0.16 |
| $MnSO_4$ | 0.16 |

The above composition (A) was dissolved in 900 ml. of water and sterilized at 115° C. for 15 minutes. A solution of 1% $NaHCO_3$ dissolved in 100 ml. of water was sterilized at 115° C. for 15 minutes. These two solutions were mixed to prepare a culture medium, 250 ml. of which were placed in shouldered shaking flask (Sakaguchi flask) of 1 liter capacity. The said *Bacillus* sp. No. 38–2 (ATCC 21783), preincubated in the same medium overnight, was inoculated in this flask, and the medium was adjusted at around 10 and shake-cultured at 37° C. for 72 hours. The cells were removed from the culture by a centrifuge, and at pH 9 1 ml. of this culture filtrate contained 3,500 units of amylase.

This culture broth was thoroughly cooled and 3 volumes of acetone were added, by which the enzyme precipitated quantitatively. This precipitate was thoroughly washed with acetone and dried in air. About 10.5 g. of brownish powder were obtained from one liter of the culture broth.

The sample obtained thereby has an optimal pH around 9.0, and it was found to be an amylase (Specific activity, 320,000 u./g.)

What we claim is:

1. An amylase which is homogenous under the conditions of ultracentrifugation analysis and gel filtration, which is monodisperse on disc electrophoretic analysis at pH 8.3, which is a liquefying amylase having a molecular weight of about 40,000 estimated by the gel filtration method, and having the optimal pH values of 4.5, 7 and 9, of sedimentation constant about 4S.

2. A process for preparing the novel amplase having physicochemical properties defined in claim 1, comprising inoculating a strain of microorganism, Bacillus sp. No. 38-2 (ATCC 21783) in a culture medium composed of a carbonate, a carbon source, a nitrogen source, and an inorganic material, cultivating the said culture medium adjusted at pH 7 to 11 at a temperature of about 30 to 37° C. for a period sufficient to impart substantial enzyme activity in the said culture medium and to produce the said amylase in the said culture medium, and collecting the said amylase from the said culture medium.

3. A process according to claim 2, wherein the incubation is carried out under aerobic submerged condition with stirring.

4. A process according to claim 2, wherein the incubation is carried out for about 24 to 64 hours.

5. A process according to claim 2 wherein said culture medium contains a sugar and the pH is adjusted to 8–11.

References Cited

FOREIGN PATENTS 2,044,513  4/1971  Germany _____ 195—64

OTHER REFERENCES

Horikoshi: Agr. Biol. Chem., vol. 35, No. 11, pp. 1783–1791 (1971).

A. LOUIS MONACELL, Primary Examiner

T. G. WISEMAN, Assistant Examiner

U.S. Cl. X.R.

195—64